United States Patent
Sunagawa et al.

[11] Patent Number: 6,040,090
[45] Date of Patent: *Mar. 21, 2000

[54] POSITIVE ELECTRODE MATERIAL FOR USE IN NON-AQUEOUS ELECTROLYTE BATTERY, PROCESS FOR PREPARING THE SAME, AND NON-AQUEOUS ELECTROLYTE BATTERY

[75] Inventors: Takuya Sunagawa; Hiroshi Watanabe, both of Hirakata; Ryuji Ohshita, Neyagawa; Masahisa Fujimoto, Osaka; Toshiyuki Nohma; Koji Nishio, both of Hirakata, all of Japan

[73] Assignee: Sanyo Electric Co., Ltd., Moriguchi, Japan

[ * ] Notice: This patent is subject to a terminal disclaimer.

[21] Appl. No.: 09/059,701

[22] Filed: Apr. 14, 1998

[30] Foreign Application Priority Data

Apr. 15, 1997 [JP] Japan .................................. 9-097239
May 8, 1997 [JP] Japan .................................. 9-117341
Aug. 27, 1997 [JP] Japan .................................. 9-230145

[51] Int. Cl.[7] .............................. H01M 4/48; H01M 4/50; H01M 4/52
[52] U.S. Cl. ................... 429/231.95; 429/223; 429/224; 429/323; 429/324
[58] Field of Search .............................. 429/231.95, 223, 429/224, 323, 324, 342, 206

[56] References Cited

U.S. PATENT DOCUMENTS 5,264,201 11/1993 Dahn et al. .
5,474,752 12/1995 Yamamoto .
5,620,812 4/1997 Tahara et al. .

FOREIGN PATENT DOCUMENTS

| | | |
|---|---|---|
| 0702421 A1 | 3/1996 | European Pat. Off. . |
| 0714144 A1 | 5/1996 | European Pat. Off. . |
| 0718902A2 | 6/1996 | European Pat. Off. ......... H01M 4/48 |
| 0720247 A1 | 7/1996 | European Pat. Off. . |
| 0720247A1 | 7/1996 | European Pat. Off. ......... H01M 4/52 |
| 0782206 A1 | 7/1997 | European Pat. Off. . |
| 0782206A1 | 7/1997 | European Pat. Off. ......... H01M 4/48 |
| 4-184872 | 7/1992 | Japan . |
| 6-267539 | 9/1994 | Japan . |
| 8-222223 | 8/1996 | Japan . |
| WO98/06670 | 2/1998 | WIPO . |

OTHER PUBLICATIONS

Patent Abstracts of Japan, vol. 096, No. 006, Jun. 28, 1996 & JP 08–031408, Feb. 2, 1996.

*Primary Examiner*—Maria Nuzzolillo
*Assistant Examiner*—Angela J. Martin
*Attorney, Agent, or Firm*—Armstrong, Westerman, Hattori, McLeland & Naughton

[57] ABSTRACT

A non-aqueous electrolyte battery according to the invention includes a positive electrode using a lithium-metal compound oxide as a positive electrode material, a negative electrode and a non-aqueous electrolyte solution, the battery employing a positive electrode material composed of the lithium-metal compound oxide which contains at least Ni, Co and Mn, and has a peak with a full width at half maximum of not greater than 0.22° in a range of $2\theta=18.71\pm0.25°$ as measured by the powder X-ray diffraction analysis using a Cu-K$\alpha$ X-ray source or employing a positive electrode material composed of a lithium-metal compound oxide which contains at least Ni, Co and Mn, and a non-aqueous electrolyte solution which includes a solvent containing ethylene carbonate and a solute containing at least one type of fluorine-containing compound.

18 Claims, 3 Drawing Sheets

POSITIVE ELECTRODE MATERIAL FOR USE IN NON-AQUEOUS ELECTROLYTE BATTERY, PROCESS FOR PREPARING THE SAME, AND NON-AQUEOUS ELECTROLYTE BATTERY

BACKGROUND OF THE INVENTION

1. Field of the Invention

The present invention relates generally to a non-aqueous electrolyte battery including a positive electrode which uses, as a positive electrode material, a lithium-metal compound oxide containing Co, Ni, Mn and the like besides Li, a negative electrode, and a non-aqueous electrolyte solution as well as to a positive electrode material for use in such a non-aqueous electrolyte battery and a process for preparing the same.

2. Description of the Related Art

Recently, non-aqueous electrolyte batteries of high electromotive force have come into practical use, as one type of advanced batteries featuring high power and high energy density. The non-aqueous electrolyte battery uses a non-aqueous electrolyte solution as the electrolyte, taking advantage of oxidation and reduction of lithium.

Such a non-aqueous electrolyte battery has generally employed, as the positive electrode material, a lithium-metal compound oxide containing Co, Ni, Mn and the like so as to obtain high voltage.

Where such a lithium-metal compound oxide is used as the positive electrode material, however, the positive electrode material reacts with the non-aqueous electrolyte solution to decompose the non-aqueous electrolyte solution and hence, lowered preservability and charge-discharge cycle characteristics of the battery result.

More recently, there has been designed a non-aqueous electrolyte battery wherein a mixture solvent of propylene carbonate and diethyl carbonate is used as a solvent in the non-aqueous electrolyte solution thereby inhibiting the aforesaid reaction of a compound oxide of lithium and transition metal s with the non-aqueous electrolyte solution, as disclosed in Japanese Unexamined Patent Publication No.4(1992)-184872.

However, in the case where the compound oxide of lithium and metals including Co, Ni, Mn and the like is used as the positive electrode material, particularly when the battery is in a charged state, there still occurs this reaction of the positive electrode material with the non-aqueous electrolyte solution and hence, a lowered charge preservability of the battery results.

Where $LiCoO_2$ or $LiNiO_2$ is used as the positive electrode material, a high discharge voltage of about 4 V is obtained for an increased energy density of the battery. Accordingly, studies have recently been made on the use of such lithium-metal compound oxides.

Unfortunately, however, the aforesaid lithium-metal compound oxides do not have a stable crystalline structure and therefore, repeated charging and discharging of the non-aqueous electrolyte battery results in destruction of the crystalline structure of the lithium-metal compound oxide. Thus, the non-aqueous electrolyte battery is gradually decreased in the discharge capacity, failing to offer a satisfactory charge-discharge cycle characteristics.

More recently, there has been proposed by Japanese Unexamined Patent Publication No.6(1994)-267539, the use of a lithium-nickel compound oxide as the positive electrode material, which compound oxide has a full width at half maximum of a peak indicative of (003) Plane in a range of between 0.14° and 0.30°, as measured by the powder X-ray diffraction analysis using a Cu-Kα X-ray source. Further, there has been proposed by Japanese Unexamined Patent Publication No.8(1996)-222223, the use of a compound oxide of lithium, cobalt and a transition metal other than cobalt, as the positive electrode material, which compound oxide has full widths at half maximum indicative of (003) Plane and (104) Plane in a range of not greater than 0.5°, as measured by the X-ray diffraction analysis.

Where, as suggested by Japanese Unexamined Patent Publication No.6(1994)-267539, the lithium-nickel compound oxide with its crystallinity controlled in the aforementioned manner is used as the positive electrode material, the charge-discharge cycle characteristics and discharge capacity of the non-aqueous electrolyte battery are improved to a degree as compared with a case where the crystallinity of the compound oxide is not controlled. Unfortunately, however, even the non-aqueous electrolyte battery using such a positive electrode material still suffers the destruction of the crystalline structure of the material due to the repeated charging and discharging of the battery. As a result, the non-aqueous electrolyte battery has not accomplished a sufficient improvement in the charge-discharge cycle characteristics.

In the case where used as the positive electrode material is the compound oxide containing lithium, cobalt and a transition metal other than cobalt, such as nickel, manganese and the like, and where the crystallinity of the compound oxide is controlled in the aforementioned manner, as disclosed in Japanese Unexamined Patent Publication No.8 (1996)-222223, the compound oxide does not have a sufficiently stable crystalline structure and therefore, repeated charging and discharging of the battery involves change in the crystalline structure. Consequently, the non-aqueous electrolyte battery cannot accomplish a sufficient improvement in the charge-discharge cycle characteristics.

SUMMARY OF THE INVENTION

It is therefore, an object of the invention to provide a non-aqueous electrolyte battery including a positive electrode using a lithium-metal compound oxide as the positive electrode material, a negative electrode, and a non-aqueous electrolyte solution, the battery being adapted to inhibit a reaction between the positive electrode material and the non-aqueous electrolyte solution thereby presenting excellent preservability and charge-discharge cycle characteristics.

It is another object of the invention to provide a non-aqueous electrolyte battery including a positive electrode using a lithium-metal compound oxide as the positive electrode material, a negative electrode and a non-aqueous electrolyte solution, the positive electrode material being so improved as to increase the initial discharge capacity of the battery and to prevent a discharge capacity decrease due to repeated charging and discharging of the battery, thereby contributing to an excellent charge-discharge cycle characteristics of the battery.

The positive electrode material for use in the non-aqueous electrolyte battery in accordance with the invention includes a lithium-metal compound oxide containing at least Ni, Co and Mn, and having a peak with a full width at half maximum (hereinafter referred to as FWHM) of not greater than 0.22° in a range of 2θ=18.71±0.25°, as measured by the powder X-ray diffraction analysis using the Cu-Kα X-ray source.

In such a positive electrode material for use in the non-aqueous electrolyte battery, LiNiO$_2$ or the compound oxide of lithium and nickel has Ni substituted with Co and Mn thereby to strengthen the crystalline structure thereof. At the same time, the lithium-metal compound oxide presents a uniform distribution of the aforesaid Ni, Co and Mn, thus possessing an increased portion with an interlayer spacing suitable for the diffusion of lithium ions.

A process for preparing the positive electrode material for use in the non-aqueous electrolyte battery in accordance with the invention comprises the steps of adding an alkaline solution to a mixture solution containing at least salts of Ni, Co and Mn thereby to obtain a compound hydroxide of the aforesaid metals, mixing the aforesaid compound hydroxide with a lithium compound, and sintering the resultant mixture of the compound hydroxide and the lithium compound.

By preparing the positive electrode material for use in the non-aqueous electrolyte battery in this manner, there is obtained the aforesaid lithium-metal compound oxide containing at least Ni, Co and Mn, and having the peak with the FWHM of not greater than 0.22° in the range of 2θ=18.71±0.25°, as measured by the powder X-ray diffraction analysis using the Cu-Kα X-ray source.

A non-aqueous electrolyte battery according to a first aspect of the invention comprises a positive electrode using a lithium-metal compound oxide as a positive electrode material, a negative electrode and a non-aqueous electrolyte solution, the positive electrode material comprising the lithium-metal compound oxide containing at least Ni, Co and Mn, and having a peak with a FWHM of not greater than 0.22° in a range of 2θ=18.71±0.25°, as measured by the powder X-ray diffraction analysis using the Cu-Kα X-ray source.

If the aforesaid positive electrode material is used, as suggested by the non-aqueous electrolyte battery of the first aspect of the invention, LiNiO$_2$ or the compound oxide of lithium and nickel has Ni substituted with Co and Mn thereby to strengthen the crystalline structure thereof and hence, the non-aqueous electrolyte battery is improved in the charge-discharge cycle characteristics, as described on the aforesaid positive electrode material for use in the non-aqueous electrolyte battery. It is further believed that the lithium-metal compound oxide presents a uniform distribution of Ni, Co and Mn, thus possessing an increased portion with an interlayer spacing suitable for the diffusion of lithium ions such that the discharge capacity of the non-aqueous electrolyte battery is also increased.

A non-aqueous electrolyte battery according to a second aspect of the invention comprises a positive electrode using a lithium-metal compound oxide as a positive electrode material, a negative electrode, and a non-aqueous electrolyte solution, the positive electrode material comprising the lithium-metal compound oxide containing at least Co, Mn and Ni, the non-aqueous electrolyte solution comprising a solvent containing ethylene carbonate and a solute containing at least one type of fluorine-containing compound.

If, as suggested by the non-aqueous electrolyte battery of the second aspect of the invention, the positive electrode material comprises the compound oxide of lithium and transition metals, which include at least Co, Mn and Ni, while the non-aqueous electrolyte solution comprises the combination of the solvent containing ethylene carbonate and the solute containing at least one type of fluorine-containing compound, a film is formed on the surface of the positive electrode material, which film serves to inhibit the reaction between the positive electrode material and the non-aqueous electrolyte solution even when the battery is in the charged state. Thus, the non-aqueous electrolyte battery is improved in the preservability and charge-discharge cycle characteristics.

These and other objects, advantages and features of the invention will become apparent from the following description thereof taken in conjunction with the accompanying drawings which illustrate specific embodiments of the invention.

DESCRIPTION OF THE PREFERRED EMBODIMENTS

Figure 1:
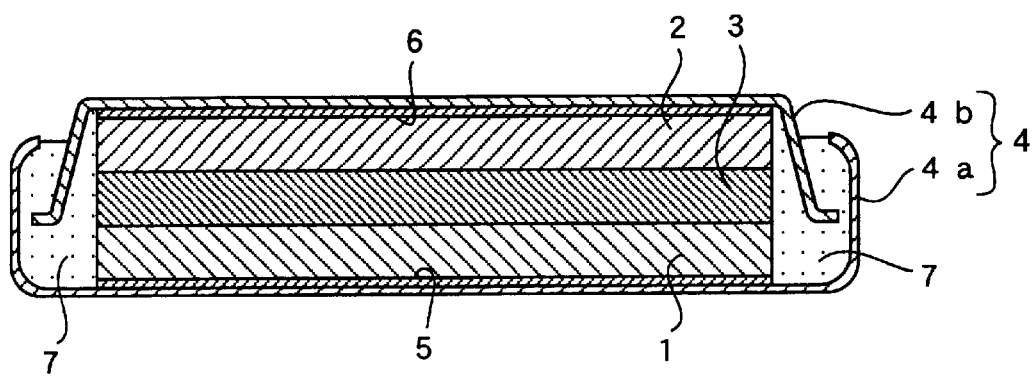
FIG. 1 is a schematic sectional view illustrating a non-aqueous electrolyte battery in accordance with Examples 1 to 23 of the invention and Comparative Examples 1 to 9.

Now, preferred embodiments of the invention will hereinbelow be described in detail.
(Non-aqueous electrolyte battery of First Aspect)
A specific description will be made on non-aqueous electrolyte batteries according to a first aspect of the invention.

As described in the foregoing, the non-aqueous electrolyte batteries according to the first aspect of the invention each employ, as the positive electrode material, a lithium-metal compound oxide which contains at least Ni, Co and Mn, and has a peak with a FWHM of not greater than 0.22° in the range of 2θ=18.71±0.25°, as measured by the powder X-ray diffraction analysis using the Cu-Kα X-ray source.

As the lithium-metal compound oxide for use in the positive electrode material, it is preferred to use a compound represented by the following general formula (1):

$$Li_aCo_bMn_c(M)_dNi_{1-(b+c+d)}O_2 \qquad (1)$$

wherein (M) denotes at least one element select from the group consisting of B, Al, Si, Fe, v, Cr, Cu, Zn, Ga and W; 0<a<1.2; 0.1≦b≦0.5; 0.05≦c≦0.4; 0.01≦d≦0.4 and 0.15≦b+c+d≦0.5.

In such a lithium-metal compound oxide, LiNiO$_2$ has Ni substituted with Co and Mn as well as with at least one element denoted by the aforesaid (M) thereby to change an electronic state of the lithium-metal compound oxide such that, in the case of repeated charge/discharge of the battery, Mn is prevented from being eluted in the non-aqueous electrolyte. Hence, by using such a lithium-metal compound oxide as the positive electrode material, the charge-discharge cycle characteristics of the non-aqueous electrolyte battery are further improved.

In addition, the aforesaid lithium-metal compound oxide for use in the positive electrode material preferably has a relationship of I(003)/I(104)≧0.8 between an intensity I(003) of the peak in the range of 2θ=18.71±0.25° and an intensity I(104) of a peak in a range of 2θ=44.54±0.25°, as measured by the powder X-ray diffraction analysis using the Cu-Kα X-ray source.

The use of such a lithium-metal compound oxide in the positive electrode material even further increases the discharge capacity of the non-aqueous electrolyte battery.

More specifically, a compound oxide of lithium and nickel includes $LiNiO_2$ as well as $Li_2Ni_8O_{10}$ and the like, which have a small insertion and extraction of lithium ions. With increase in the proportion of $Li_2Ni_8O_{10}$ and the like, the aforesaid value $I(003)/I(104)$ decreases so that the positive electrode material is decreased in the discharge capacity. Accordingly, if the lithium-metal compound oxide having the value $I(003)/I(104)$ of not smaller than 0.8 is used, the proportion of $Li_2Ni_8O_{10}$ and the like having a small insertion and extraction of lithium ions is decreased so that the discharge capacity of the non-aqueous electrolyte battery is increased.

In order to prepare the aforementioned lithium-metal compound oxide containing at least Ni, Co and Mn, and having the peak with the FWHM of not greater than $0.22°$ in the range of $2\theta=18.71±0.25°$, as measured by the powder X-ray diffraction analysis using the Cu-K$\alpha$ X-ray source, it is required to uniformly mix at least Ni, Co and Mn. In order to uniformly mix at least Ni, Co and Mn, very fine particles of these ingredients for the positive electrode material are blended into a mixture product. Otherwise, solutions of these ingredients are mixed together and the resultant mixture solution is removed of solvents by evaporation thereby to obtain a mixture product. Subsequently, the resultant mixture product is heat treated to obtain the aforesaid compound oxide of lithium and transition metals.

In the lithium-metal compound oxide, the smaller the FWHM of the peak within the range of $2\theta=18.71±0.25°$, the less the disorder of the crystalline structure of the compound oxide.

A process for preparing this lithium-metal compound oxide having the peak with a small FWHM in the range of $2\theta=18.71±0.25°$ preferably comprises the steps of adding an alkaline solution to a mixture solution at least containing salts of Ni, Co and Mn thereby to obtain a compound hydroxide of these metals, mixing a lithium compound with the aforesaid compound hydroxide, and sintering the resultant mixture product of the compound hydroxide and lithium compound.

In the compound oxide of lithium and transition metals thus prepared, the peak within the range of $2\theta=18.71±0.25°$ has a FWHM of about $0.15°$ such that the disorder of the crystalline structure of the compound oxide is decreased. The use of such a positive electrode material further increases the discharge capacity of the non-aqueous electrolyte battery. It is to be noted that the process for preparing the compound oxide of lithium and transition metals used as the positive electrode material is not particularly limited to the above method. As a matter of course, a compound oxide of lithium and transition metals having the aforesaid peak with a smaller FWHM than the above value is also usable.

The non-aqueous electrolyte battery according to the first aspect of the invention may employ known negative electrode materials for the negative electrode thereof. Examples of the usable negative electrode material include lithium alloys such as metal lithium, Li-Al, Li-In, Li-Sn, Li-Pb, Li-Bi, Li-Ga, Li-Sr, Li-Si, Li-Zn, Li-Cd, Li-Ca, Li-Ba and the like, and carbon materials capable of absorbing and desorbing lithium ions, such as graphite, coke, sintered organic substances and the like.

In the non-aqueous electrolyte battery according to the first aspect of the invention, conventionally known non-aqueous electrolyte solutions may be used as the aforesaid non-aqueous electrolyte.

Examples of a solvent usable for the non-aqueous electrolyte solution include ethylene carbonate, propylene carbonate, butylene carbonate, vinylene carbonate, cyclopenthanone, sulfolane, dimethylsulfolane, 3-methyl-1, 3-oxazolidine-2-one, $\gamma$-butyrolactone, dimethyl carbonate, diethyl carbonate, ethyl methyl carbonate, methylpropyl carbonate, butyl methyl carbonate, ethylpropyl carbonate, butyl ethyl carbonate, dipropyl carbonate, 1,2-dimethoxyethane, tetrahydrofuran, 2-methyltetrahydrofuran, 1,3-dioxolane, methyl acetate, ethyl acetate and the like. These solvents may be used alone or in combination of two or more types.

In the non-aqueous electrolyte solution, known solutes may be used as the solute dissolved in the aforesaid solvent. Examples of the usable solute include lithium compounds such as $LiPF_6$, $LiBF_4$, $LiClO_4$, $LiCF_3SO_3$, $LiAsF_6$, $LiN(CF_3SO_2)_2$, $LiOSO_2(CF_2)_3CF_3$, $LiN(C_2F_5SO_2)_2$ and the like.

Particularly, if the non-aqueous electrolyte solution includes a combination of a solvent containing ethylene carbonate and a solute containing at least one type of fluorine-containing compound, a film is formed on the surface of the positive electrode material, as suggested by the non-aqueous electrolyte battery according to the second aspect of the invention. This film serves to inhibit the reaction between the positive electrode material and the non-aqueous electrolyte solution even in the charged state of the battery and hence, the non-aqueous electrolyte battery is improved in the preservability and charge-discharge cycle characteristics.

Next, the non-aqueous electrolyte battery according to the first aspect of the invention will be described in detail by way of reference to the examples of the invention. Furthermore, the description will also make apparent by way of comparison with comparative examples that the non-aqueous electrolyte batteries of the examples hereof are improved in the initial discharge capacity and charge-discharge cycle characteristics. It is to be distinctly appreciated that the non-aqueous electrolyte battery according to the first aspect of the invention should not be limited to the following examples but appropriate changes and modifications may be made in carrying out the invention without departing from the spirit and scope of the invention.

EXAMPLES 1 to 17 and COMPARATIVE EXAMPLES 1 to 3

In Examples 1 to 17 and Comparative Examples 1 to 3, there were used a positive electrode, a negative electrode and a non-aqueous electrolyte solution prepared in the following manners, respectively, so as to fabricate a flat coin-type non-aqueous electrolyte battery, as shown in FIG. 1.

(Preparation of Positive Electrode)

In the preparation of the positive electrode, particles of $Ni(OH)_2$, $Co(OH)_2$, $Mn_2O_3$ and $Al(OH)_3$ having a mean particle size of 0.05 $\mu$m were added to LiOH in a predetermined molar ratio and mixed together in Ishikawa-type Raikai Mortar. The resultant mixture was heat treated in an atmosphere of dry air at $800°$ C. for 8 hours thereby to obtain a compound oxide of lithium and transition metals containing Li, Ni, Co, Mn and Al in a molar ratio as shown in the following Tables 1 and 2. The resultant compound oxide was crushed in Ishikawa-type Raikai Mortar to obtain a positive electrode material for each example and comparative example, which had a mean particle size of about 5 $\mu$m.

Each of the resultant positive electrode materials was kneaded with acetylene black, as a conductive material, and a polyvinylidene fluoride, as a binder, in a weight ratio of 90:6:4 thereby to obtain a positive electrode mixture. Each of the positive electrode mixtures was subject to a pressure of 2 t/cm$^2$ to be formed into a disk with a diameter of 20 mm. The resultant disks were heat treated in vacuum at 250° C. for 2 hours thereby to give the positive electrodes of the above examples and comparative examples.

(Preparation of Negative Electrode)

In the preparation of the negative electrode, a 20-mm diameter disk was formed by punching a rolled sheet of lithium-aluminum alloy of a predetermined thickness. Thus were obtained the negative electrodes of the above examples and comparative examples.

(Preparation of Non-aqueous Electrolyte Solution)

In the preparation of the non-aqueous electrolyte solution, ethylene carbonate and dimethyl carbonate were mixed in a volume ratio of 1:1 to give a mixture solvent, in which a solute of LiPF$_6$ was dissolved in a concentration of 1 mol/l.

(Fabrication of Battery)

In the preparation of the battery, as shown in FIG. 1, each positive electrode 1 prepared in the aforementioned manner was attached to a positive-electrode current collector 5 while each negative electrode 2 abovementioned was attached to a negative-electrode current collector 6. A separator 3 formed of an ion-permeable polypropylene film was impregnated with the aforesaid non-aqueous electrolyte solution and then, interposed between the positive electrode 1 and the negative electrode 2. The positive electrode, separator and negative electrode in this state were packed in a battery case 4 including a positive-electrode can 4$a$ and a negative-electrode can 4$b$. In the battery case, the positive electrode 1 was connected to the positive-electrode can 4$a$ via the positive-electrode current collector 5 and the negative electrode 2 was connected to the negative-electrode can 4$b$ via the negative-electrode current collector 6, while the positive-electrode can 4$a$ is electrically insulated from the negative-electrode can 4$b$ by means of an insulating packing 7. Thus were fabricated the non-aqueous electrolyte batteries of Examples 1 to 17 and of Comparative Examples 1 to 3.

EXAMPLE 18

A non-aqueous electrolyte battery of Example 18 was fabricated in the same manner as in Examples 1 to 17 and Comparative Examples 1 to 3, except for that in the preparation of the positive electrode, particles of Ni(OH)$_2$, Co(OH)$_2$, Mn$_2$O$_3$ and Al(OH)$_3$ having a mean particle size of 0.05 $\mu$m were added to LiOH in the same molar ratio as in Example 5 so as to be mixed together in Ishikawa-type Raikai Mortar and then the resultant mixture was heat treated in the atmosphere of dry air at 800° C. for 20 hours.

EXAMPLE 19

A non-aqueous electrolyte battery of Example 19 was fabricated in the same manner as in Examples 1 to 17 and Comparative Examples 1 to 3, except for that in the preparation of the positive electrode, particles of Ni(OH)$_2$, CO(OH)$_2$, Mn$_2$O$_3$ and Al(OH)$_3$ having a mean particle size of 0.05 $\mu$m were added to LiOH in the same molar ratio as in Example 5 so as to be mixed together in Ishikawa-type Raikai Mortar and then the resultant mixture was heat treated in the atmosphere of dry air at 850° C. for 8 hours.

EXAMPLE 20

In the preparation of a positive electrode of Example 20, a mixture solution containing Ni, Co and Mn in a molar ratio of Ni:Co:Mn=0.9:0.01:0.09 was prepared by agitating nickel sulfate, cobalt sulfate and manganese sulfate in an agitating vessel. The resultant mixture solution was further agitated with an aqueous solution of sodium hydroxide gradually added thereto whereby a hydroxide of Ni, Co and Mn was coprecipitated. Thus was obtained a compound hydroxide of these metals represented by a composition formula of $Ni_{0.9}Co_{0.01}Mn_{0.09}(OH)_2$ and having a configuration wherein a part of nickel atoms of nickel hydroxide was uniformly substituted with atoms of cobalt and manganese.

Then, the compound hydroxide of these metals was mixed with LiOH. At this time, a molar ratio of Li to the sum of the metal elements contained in the metal compound hydroxide was 1:1. Subsequently, the resultant mixture product was heat treated in the atmosphere of dry air at 800° C. for 8 hours to obtain a lithium-metal compound oxide. Using this lithium-metal compound oxide as the positive electrode material, the positive electrode and then a non-aqueous electrolyte battery were produced in the same manner as in Examples 1 to 17 and Comparative Examples 1 to 3.

EXAMPLE 21

In the preparation of a positive electrode of Example 21, a mixture solution containing Ni, Co and Mn in a molar ratio of Ni:Co:Mn=0.5:0.4:0.1 was prepared by agitating nickel sulfate, cobalt sulfate and manganese sulfate in the agitating vessel. The resultant mixture solution was further agitated with an aqueous solution of sodium hydroxide gradually added thereto whereby a hydroxide of these metals was coprecipitated. Thus was obtained a compound hydroxide of the metals represented by a composition formula of $Ni_{0.5}Co_{0.4}Mn_{0.1}(OH)_2$ and having a configuration wherein a part of nickel atoms of nickel hydroxide was uniformly substituted with atoms of cobalt and manganese.

Then, the compound hydroxide of the metals was used to prepare a lithium-metal compound oxide in the same manner as in Example 20. Using this lithium-metal compound oxide as the positive electrode material, a non-aqueous electrolyte battery was fabricated.

EXAMPLE 22

In the preparation of a positive electrode of Example 22, a mixture solution containing Ni, Co, Mn and Al in a molar ratio of Ni:Co:Mn:Al=0.84:0.1:0.05:0.01 was prepared by agitating nickel sulfate, cobalt sulfate, manganese sulfate and aluminum sulfate in the agitating vessel. The resultant mixture solution was further agitated with an aqueous solution of sodium hydroxide gradually added thereto whereby a hydroxide of these metals was coprecipitated. Thus was obtained a compound hydroxide of the metals represented by a composition formula of $Ni_{0.84}Co_{0.1}Mn_{0.05}Al_{0.01}(OH)_2$ and having a configuration wherein a part of nickel atoms of nickel hydroxide was uniformly substituted with atoms of cobalt, manganese and aluminum.

Then, the compound hydroxide of these metals was used to prepare a lithium-metal compound oxide in the same manner as in Example 20. Using this lithium-metal compound oxide as the positive electrode material, a non-aqueous electrolyte battery was fabricated.

EXAMPLE 23

In the preparation of a positive electrode of Example 23, a mixture solution containing Ni, Co, Mn and Al in a molar ratio of Ni:Co:Mn:Al=0.5:0.1:0.39:0.01 was prepared by agitating nickel sulfate, cobalt sulfate, manganese sulfate and aluminum sulfate in the agitating vessel. The resultant mixture solution was further agitated with an aqueous solution of sodium hydroxide gradually added thereto whereby a hydroxide of these metals was coprecipitated. Thus was obtained a compound hydroxide of the metals represented by a composition formula of $Ni_{0.5}Co_{0.1}Mn_{0.39}Al_{0.01}(OH)_2$ and having a configuration wherein a part of nickel atoms of nickel hydroxide was uniformly substituted with atoms of cobalt, manganese and aluminum.

Then, the compound hydroxide of these metals was used to prepare a lithium-metal compound oxide in the same manner as in Example 20. Using this lithium-metal compound oxide as the positive electrode material, a non-aqueous electrolyte battery was fabricated.

COMPARATIVE EXAMPLE 4

In the preparation of a positive electrode of Comparative Example 4, particles of $Ni(OH)_2$, $Co(OH)_2$, $Mn_2O_3$ and $Al(OH)_3$ having a great mean particle size of 10 μm were added to LiOH in the same molar ratio as in Example 5. The subsequent steps were performed in the same manner as in Examples 1 to 17 and Comparative Examples 1 to 3 thereby to obtain a lithium-metal compound oxide and then to fabricate a non-aqueous electrolyte battery, using this lithium-metal compound oxide as the positive electrode material.

COMPARATIVE EXAMPLE 5

In the preparation of a positive electrode of Comparative Example 5, particles of $Ni(OH)_2$, $Co(OH)_2$, $Mn_2O_3$ and $Al(OH)_3$ having a great mean particle size of 10 μm, similarly to Comparative Example 4, were added to LiOH in the same molar ratio as in Example 5 so as to be mixed together in Ishikawa-type Raikai Mortar. The resultant mixture was heat treated in the atmosphere of dry air at 800° C. for 20 hours. The subsequent steps were performed in the same manner as in Examples 1 to 17 and Comparative Examples 1 to 3 thereby to obtain a lithium-metal compound oxide and then to fabricate a non-aqueous electrolyte battery, using this lithium-metal compound oxide as the positive electrode material.

COMPARATIVE EXAMPLE 6

In the preparation of a positive electrode of Comparative Example 6, particles of $Ni(OH)_2$, $Co(OH)_2$, $Mn_2O_3$ and $Al(OH)_3$ having a great mean particle size of 10 μm, similarly to Comparative Example 4, were added to LiOH in the same molar ratio as in Example 5 so as to be mixed together in Ishikawa-type Raikai Mortar. The resultant mixture was heat treated in the atmosphere of dry air at 850° C. for 8 hours. The subsequent steps were performed in the same manner as in Examples 1 to 17 and Comparative Examples 1 to 3 thereby to obtain a lithium-metal compound oxide and then to fabricate a non-aqueous electrolyte battery, using this lithium-metal compound oxide as the positive electrode material.

COMPARATIVE EXAMPLE 7

In the preparation of a positive electrode of Comparative Example 7, particles of nickel hydroxide serving as cores were dispersed in an aqueous solution of nickel sulfate of a density of 1N in the agitating vessel. Then, flake-like particles of sodium hydroxide were added to the resultant dispersion solution, which was agitated with a solution temperature maintained at 40° C. The dispersion solution was further agitated with powders of nickel sulfate and sodium hydroxide added thereto whereby sphere-like particles of nickel hydroxide, $Ni(OH)_2$, were obtained.

The resultant $Ni(OH)_2$ and LiOH were mixed together in a molar ratio of 1:1. The subsequent steps were performed in the same manner as in Examples 1 to 17 and Comparative Examples 1 to 3 thereby to obtain a lithium-metal compound oxide and then to fabricate a non-aqueous electrolyte battery, using this lithium-metal compound oxide as the positive electrode material.

COMPARATIVE EXAMPLE 8

In the preparation of a positive electrode of Comparative Example 8, sphere-like particles of nickel hydroxide, $Ni(OH)_2$, obtained in the same manner as in Comparative Example 7 were mixed with LiOH and $CO(OH)_2$ in a molar ratio of Li:Ni:Co=1:0.8:0.2. The subsequent steps were performed in the same manner as in Examples 1 to 17 and Comparative Examples 1 to 3 thereby to obtain a lithium-metal compound oxide and then to fabricate a non-aqueous electrolyte battery, using this lithium-metal compound oxide as the positive electrode material.

COMPARATIVE EXAMPLE 9

In the preparation of a positive electrode of Comparative Example 9, particles of $Ni(OH)_2$ having a great mean particle size of 10 μm, similarly to Comparative Example 4, were mixed with LiOH in a molar ratio of Li:Ni=1:1. The subsequent steps were performed in the same manner as in Examples 1 to 17 and Comparative Examples 1 to 3 thereby to obtain a lithium-metal compound oxide and then to fabricate a non-aqueous electrolyte battery, using this lithium-metal compound oxide as the positive electrode material.

Now, as to the positive electrode materials for use in the non-aqueous electrolyte batteries of Examples 1 to 23 and Comparative Examples 1 to 9, a FWHM of the peak in the range of $2\theta=18.71\pm0.25°$ was determined by the powder X-ray diffraction analysis using the Cu-Kα X-ray source, respectively. In addition, a peak intensity ratio I(003)/I(104) was determined from an intensity I(003) of the peak in the range of $2\theta=18.71\pm0.25°$ and an intensity I(104) of the peak in the range of $2\theta=44.54\pm0.25°$. The results are shown in the following Tables 1 and 2.

Each of the non-aqueous electrolyte batteries of Examples 1 to 23 and Comparative Examples 1 to 9 thus fabricated was subjected to repeated charge/discharge processes in a cycle of charging the battery at a 0.5 $mA/cm^2$ charging current to a charge cut-off voltage of 4.25 V followed by discharging the battery at a 0.5 $mA/cm^2$ discharging current to a discharge cut-off voltage of 2.75 V, so that a discharge capacity of each non-aqueous electrolyte battery at the first cycle was determined. On the other hand, there was determined a number of cycles at which the discharge capacity of the battery is decreased to less than 90% of a discharge capacity at the first cycle. The results are shown in the following Tables 1 and 2.

TABLE 1

| | Li-T.M. Compound Oxide | | | | | FWHM | Peak Intensity | Number of | Discharge Capacity |
|---|---|---|---|---|---|---|---|---|---|
| | Li | Ni | Co | Mn | Al | (°) | Ratio | Cycles | (mAh/g) |
| Ex. 1 | 1.00 | 0.90 | 0.01 | 0.09 | 0.00 | 0.17 | 1.8 | 150 | 210 |
| Ex. 2 | 1.00 | 0.90 | 0.09 | 0.01 | 0.00 | 0.18 | 1.5 | 142 | 205 |
| Ex. 3 | 1.00 | 0.50 | 0.10 | 0.40 | 0.00 | 0.20 | 1.7 | 147 | 200 |
| Ex. 4 | 1.00 | 0.50 | 0.40 | 0.10 | 0.00 | 0.22 | 1.3 | 151 | 202 |
| Ex. 5 | 1.00 | 0.84 | 0.10 | 0.05 | 0.01 | 0.21 | 0.8 | 192 | 199 |
| Ex. 6 | 1.00 | 0.74 | 0.20 | 0.05 | 0.01 | 0.20 | 1.2 | 196 | 201 |
| Ex. 7 | 1.00 | 0.50 | 0.44 | 0.05 | 0.01 | 0.21 | 1.3 | 188 | 198 |
| Ex. 8 | 1.00 | 0.74 | 0.10 | 0.15 | 0.01 | 0.18 | 1.7 | 184 | 205 |
| Ex. 9 | 1.00 | 0.50 | 0.10 | 0.39 | 0.01 | 0.19 | 1.5 | 186 | 210 |
| Ex. 10 | 1.00 | 0.74 | 0.10 | 0.05 | 0.11 | 0.19 | 1.4 | 190 | 197 |
| Ex. 11 | 1.00 | 0.50 | 0.10 | 0.01 | 0.39 | 0.20 | 1.2 | 189 | 199 |
| Ex. 12 | 1.00 | 0.89 | 0.05 | 0.05 | 0.01 | 0.19 | 1.8 | 142 | 202 |
| Ex. 13 | 1.00 | 0.88 | 0.10 | 0.01 | 0.01 | 0.18 | 1.4 | 140 | 203 |
| Ex. 14 | 1.00 | 0.85 | 0.10 | 0.05 | 0.00 | 0.16 | 1.3 | 138 | 198 |
| Ex. 15 | 1.00 | 0.49 | 0.45 | 0.05 | 0.01 | 0.18 | 1.9 | 145 | 200 |
| Ex. 16 | 1.00 | 0.49 | 0.10 | 0.40 | 0.01 | 0.20 | 1.6 | 140 | 201 |
| Ex. 17 | 1.00 | 0.49 | 0.10 | 0.05 | 0.36 | 0.19 | 1.8 | 139 | 198 |
| Ex. 18 | 1.00 | 0.84 | 0.10 | 0.05 | 0.01 | 0.20 | 0.7 | 191 | 185 |
| Ex. 19 | 1.00 | 0.84 | 0.10 | 0.05 | 0.01 | 0.21 | 0.6 | 190 | 187 |
| Ex. 20 | 1.00 | 0.90 | 0.01 | 0.09 | 0.00 | 0.15 | 1.7 | 148 | 224 |
| Ex. 21 | 1.00 | 0.50 | 0.40 | 0.10 | 0.00 | 0.15 | 1.5 | 149 | 219 |
| Ex. 22 | 1.00 | 0.84 | 0.10 | 0.05 | 0.01 | 0.15 | 1.2 | 193 | 212 |
| Ex. 23 | 1.00 | 0.50 | 0.10 | 0.39 | 0.01 | 0.15 | 1.4 | 189 | 230 |

TABLE 2

| | Li-T.M. Compound Oxide | | | | | FWHM | Peak Intensity | Number of | Discharge Capacity |
|---|---|---|---|---|---|---|---|---|---|
| | Li | Ni | Co | Mn | Al | (°) | Ratio | Cycles | (mAh/g) |
| C. Ex. 1 | 1.00 | 1.00 | 0.00 | 0.00 | 0.00 | 0.17 | 1.1 | 60 | 160 |
| C. Ex. 2 | 1.00 | 0.90 | 0.10 | 0.00 | 0.00 | 0.18 | 1.3 | 57 | 154 |
| C. Ex. 3 | 1.00 | 0.90 | 0.00 | 0.10 | 0.00 | 0.20 | 1.3 | 61 | 155 |
| C. Ex. 4 | 1.00 | 0.84 | 0.10 | 0.05 | 0.01 | 0.34 | 1.5 | 187 | 150 |
| C. Ex. 5 | 1.00 | 0.84 | 0.10 | 0.05 | 0.01 | 0.37 | 1.7 | 190 | 153 |
| C. Ex. 6 | 1.00 | 0.84 | 0.10 | 0.05 | 0.01 | 0.37 | 1.7 | 186 | 154 |
| C. Ex. 7 | 1.00 | 1.00 | 0.00 | 0.00 | 0.00 | 0.15 | 2.0 | 58 | 163 |
| C. Ex. 8 | 1.00 | 0.80 | 0.20 | 0.00 | 0.00 | 0.17 | 1.9 | 61 | 167 |
| C. Ex. 9 | 1.00 | 1.00 | 0.00 | 0.00 | 0.00 | 0.23 | 1.9 | 42 | 150 |

According to a comparison between the non-aqueous electrolyte batteries of Examples 1 to 23 and those of Comparative Examples 1 to 3 and 7 to 9, although all these batteries of the above examples and comparative examples employ a lithium-metal compound oxide having the peak with the FWHM of not greater than 0.22° in the range of 2θ=18.71±0.25°, respectively, the batteries of Examples 1 to 23, each of which employs, as the positive electrode material, a compound oxide of lithium and metals including at least Ni, Co and Mn, have accomplished far more greater improvement in the charge-discharge cycle characteristics and the initial discharge capacity than the batteries of Comparative Examples 1 to 3 and 7 to 9, each of which employs, as the positive electrode material, a compound oxide of lithium and metals including Ni but excluding at least one of Co and Mn.

According to a comparison between the non-aqueous electrolyte batteries of Examples 5 and 22 and those of Comparative Examples 4 to 6 wherein the lithium-metal compound oxides containing Li, Ni, Co, Mn and Al in the same molar ratio were used as the positive electrode material, the batteries of Examples 5 and 22, each of which employs a positive electrode material having the peak with the FWHM of not greater than 0.22° in the range of 2θ=18.71°±0.25°, have accomplished far more greater improvement in the initial discharge capacity than the batteries of Comparative Examples 4 to 6 each of which employs a positive electrode material having the peak with the FWHM of greater than 0.22° in the range of 2θ=18.71°±0.25°.

As to the lithium-metal compound oxides used as the positive electrode material, a comparison was made between the non-aqueous electrolyte batteries of Examples 1, 4, 5 and 9 and those of Examples 20 to 23, the molar ratios of Li, Ni, Co, Mn and Al of Examples 1, 4, 5 and 9 corresponding to those of Examples 20 to 23, respectively. The non-aqueous electrolyte batteries of Examples 20 to 23 have accomplished a greater improvement in the initial discharge capacity than those of Examples 1, 4, 5 and 9, Examples 20 to 23 each employing the positive electrode material prepared by the steps of neutralizing the mixture solution containing sulfates of Ni, Co, Mn and Al for coprecipitation of the hydroxide of these metals and treating the metal hydroxide thus coprecipitated, whereas Examples 1, 4, 5 and 9 each employing the positive electrode material prepared by the steps of mixing particulate hydroxides of these metals having a mean particle size of 0.05 μm and treating the resultant mixture product. It is thought that where a mixture solution containing hydroxides of metals is neutralized by adding thereto an alkaline solution thereby to coprecipitate the hydroxide of the metals, as suggested by the non-aqueous electrolyte batteries of Examples 20 to 23, a lithium-metal compound oxide can be obtained without impairing the structure of $LiNiO_2$, in contrast to the case where particulate hydroxides of the metals having a small mean particle size of 0.05 μm are mixed together. As a result, the lithium-metal compound oxide possesses an increased portion with crystalline structure suitable for the diffusion of lithium ions so that the initial discharge capacity of the battery is further improved.

According to a comparison among the non-aqueous electrolyte batteries of Examples 1 to 23, the batteries of Examples 5 to 11, 18, 19, 22 and 23, which employ the lithium-metal compound oxide represented by the general formula (1) as the positive electrode material, have accomplish even greater improvement in the charge-discharge cycle characteristics than the batteries of Examples 1 to 4, 12 to 17, 20 and 21 which employ the lithium-metal compound oxides other than the above as the positive electrode material, respectively.

According to a comparison between the non-aqueous electrolyte batteries of Examples 1 to 17 and those of Examples 18 and 19, the batteries of Examples 1 to 17, each of which employs the positive electrode material having a peak intensity ratio I(003)/I(104) of not smaller than 0.8, have accomplished greater improvement in the discharge capacity than the batteries of Examples 18 and 19 each of which employs the positive electrode material having a value I(003)/I(104) of smaller than 0.8, the peak intensity ratio I(003)/I(104) defined as the ratio of an intensity I(003) of the peak in the range of 2θ=18.71±0.25° to an intensity I(104) of the peak in the range of 2θ=44.54±0.25°.

The aforementioned Examples 1 to 23 exemplify the lithium-metal compound oxides used as the positive electrode material, which compound oxide contains Li and the other metals such as Ni, Co and Mn and optionally Al. However, similar effects may be obtained by replacing Al with at least one element selected from the group consisting of B, Si, Fe, V, Cr, Cu, Zn, Ga and W.

In the aforementioned Examples 1 to 23, oxides or hydroxides of Ni, Co, Mn and Al are used as ingredients for the lithium-metal compound oxides but nitrates, carbonates, sulfates, acetates, oxalates and the like of Ni, Co, Mn and Al are also usable.

In the aforementioned Examples 20 to 23, sulfates of Ni, Co, Mn and Al are used as ingredients for the compound hydroxide of Ni, Co, Mn and Al, but any ingredients may be used as long as only the hydroxide of these metals can be coprecipitated by the neutralization reaction. Examples of the usable ingredient include acetates, oxalates, citrates and the like of Ni, Co, Mn and Al.

In the aforementioned Examples 20 to 23, the solution of sodium hydroxide is used as the alkaline solution for neutralizing the mixture solution containing sulfates of Ni, Co, Mn and Al thereby coprecipitating the hydroxide of these metals but any alkaline solution be used as long as only the hydroxide of these metals are coprecipitated by the neutralization reaction. Examples of the usable alkaline solution include solutions of lithium hydroxide, potassium hydroxide, cesium hydroxide and the like.

In the aforementioned Examples 20 to 23, sodium hydroxide is simply added to the aforesaid mixture solution of sulfates of Ni, Co, Mn and Al thereby coprecipitating the hydroxide of these metals. In this case, however, a pH adjuster, such as ammonia, may be added to control the rate of formation of the hydroxide of these metals for uniform combination of these metals.

(Non-Aqueous Electrolyte Battery of Second Aspect)

A specific description will be made on non-aqueous electrolyte batteries according to a second aspect of the invention.

In the non-aqueous electrolyte battery according to the second aspect of the invention, the aforesaid lithium-metal compound oxide containing at least Ni, Co and Mn, is used as the positive electrode material, whereas the solvent containing ethylene carbonate is used in combination with the solute containing at least one type of fluorine-containing compound, as the non-aqueous electrolyte solution.

The lithium-metal compound oxide used as the positive electrode material preferably has the peak with a FWHM of not greater than 0.22° in the range of 2θ=18.71±0.25°, as measured by the powder X-ray diffraction analysis using the Cu-Kα X-ray source. In the case of such a positive electrode material, as suggested by the non-aqueous electrolyte battery of the first aspect of the invention, the compound oxide of lithium and nickel, or $LiNiO_2$, has Ni substituted with Co and Mn thereby presenting a strengthened crystalline structure and thus, the non-aqueous electrolyte battery is improved in the charge-discharge cycle characteristics. Furthermore, it is thought that the aforesaid Ni, Co and Mn are uniformly distributed in the lithium-metal compound oxide thereby increasing the portion with the interlayer spacing suitable for the diffusion of lithium ions and hence, the non-aqueous electrolyte battery is increased in the discharge capacity.

As the lithium-metal compound oxide for use in the positive electrode material, it is preferred to use a compound represented by the following general formula (2):

$$Li_aCo_bMn_c(M)_dNi_{1-(b+c+d)}O_2 \qquad (2)$$

wherein (M) denotes at least one element selected from the group consisting of B, Al, Si, Fe, V, Cr, Cu, Zn, Ga and W; 0<a<1.2; 0.1≦b≦0.5; 0.05≦c≦0.4; 0.01≦d≦0.4 and 0.15≦b+c+d≦0.5.

The use of such a positive electrode material provides a more positive inhibition of the reaction with the non-aqueous electrolyte solution and hence, the preservability and charge-discharge cycle characteristics of the non-aqueous electrolyte battery is further improved.

The non-aqueous electrolyte battery according to the second aspect of the invention may employ generally known negative electrode materials for its negative electrode. Even in a case where there is employed a carbon material, such as graphite and coke, which has a great surface area thus having a high reactivity with the non-aqueous electrolyte solution, the reaction between the non-aqueous electrolyte solution and the carbon material as the negative electrode material is also inhibited by using the carbon material in combination with the aforesaid non-aqueous electrolyte solution. This results in the improvement of the charge-discharge cycle characteristics and preservability of the non-aqueous electrolyte battery.

In the non-aqueous electrolyte battery of the second aspect of the invention, the aforesaid solvent containing at least ethylene carbonate may be used as the solvent in the non-aqueous electrolyte solution. It is preferred to use a mixture solvent containing ethylene carbonate and any of other known solvents.

In mixing ethylene carbonate with another solvent, an insufficient amount of ethylene carbonate results in a poor ionic conductivity of the non-aqueous electrolyte solution whereas an excessive amount of ethylene carbonate results in an excessive viscosity and also a poor ionic conductivity of the non-aqueous electrolyte solution. Therefore, a content of ethylene carbonate in the solvent is preferably in a range of between 20 and 80 vol %.

The solute for use in the non-aqueous electrolyte solution may contain at least one type of fluorine-containing compound, as described in the foregoing. Usable as the fluorine-containing compound are known fluorine-containing compounds generally used as the solute. Examples of the usable fluorine-containing compound include $LiPF_6$, $LiBF_4$, $LiN(C_2F_5SO_2)_2$, $LiAsF_6$ and the like. Although such a fluorine-containing compound may be used in combination with any of other known solutes, it is more preferred to use the fluorine-containing compound alone.

In adding the solute containing at least one type of fluorine-containing compound to the non-aqueous electrolyte solution, an excessive or insufficient amount of added solute results in a reduced ionic conductivity of the non-aqueous electrolyte solution. Therefore, a total amount of solute contained in the non-aqueous electrolyte solution is preferably in a range of between 0.5 and 2.0 mol/l.

Next, the non-aqueous electrolyte battery according to the second aspect of the invention will be described in detail by way of reference to the examples thereof. In addition, the description will also make apparent by way of comparison with comparative examples that the non-aqueous electrolyte batteries according to the examples of the invention suffer less discharge capacity decrease when stored in the charged state and present improved charge-discharge cycle characteristics. It is to be distinctly appreciated that the non-aqueous electrolyte battery according to the second aspect of the invention should not be limited to the following examples but appropriate changes and variations may be made in carrying out the invention without departing from the spirit and scope thereof.

EXAMPLES 24 to 31 AND COMPARATIVE EXAMPLES 10 to 12

Figure 2:
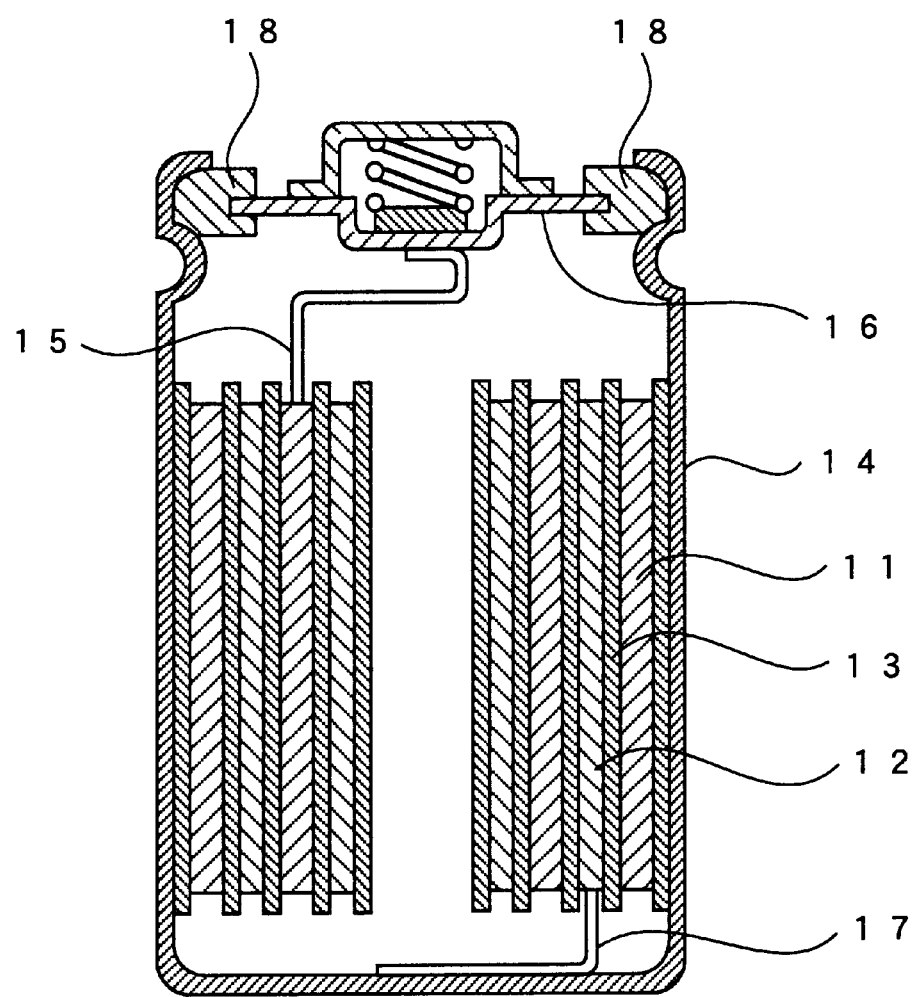
FIG. 2 is a schematic sectional view illustrating a non-aqueous electrolyte battery in accordance with Examples 24 to 51 of the invention and Comparative Examples 10 to 18.

In Examples 24 to 31 and Comparative Examples 10 to 12, a positive electrode, a negative electrode and a non-aqueous electrolyte solution prepared in the following manners were used, respectively, thereby to fabricate a cylindrical type non-aqueous electrolyte battery of AA size, as shown in FIG. 2.

(Preparation of Positive Electrode)

In the preparation of the positive electrode, a powder of $LiNi_{0.7}Co_{0.2}Mn_{0.1}O_2$ as the positive electrode material was mixed with an artificial graphite as a conductive material. Added to the resultant mixture was a solution obtained by dissolving polyvinylidene fluoride, as a binder, in N-methyl-2-pyrolidone (NMP) thereby to obtain a mixture containing the aforesaid positive electrode material, artificial graphite and polyvinylidene fluoride in a weight ratio of 85:10:5. The resultant mixture was kneaded into a slurry, which was applied to the both sides of an aluminum foil as the positive-electrode current collector by means of the doctor blade coating method and then subject to drying to give the positive electrode.

The positive electrode material of $LiNi_{0.7}Co_{0.2}Mn_{0.1}O_2$ was subject to the powder X-ray diffraction analysis using the Cu-Kα X-ray source, thereby to determine a FWHM of the peak in the range of $2\theta=18.71\pm0.25°$. At the same time, a peak intensity ratio I(003)/I(104) was determined from an intensity I(003) of the peak in the range of $2\theta=18.71\pm0.25°$ and an intensity I(104) of the peak in the range of $2\theta=44.54\pm0.25°$. The FWHM was 0.20° and the peak intensity ratio I(003)/I(104) was 1.1.

(Preparation of Negative Electrode)

In the preparation of the negative electrode, a powder of natural graphite having a spacing of (002) Plane, $d_{002}$, of 3.35 Å was used as the negative electrode material. Added to the natural graphite powder was a solution obtained by dissolving polyvinylidene fluoride, as the binder, in the aforesaid NMP, thereby to obtain a mixture containing the natural graphite powder and polyvinylidene fluoride in a weight ratio of 95:5. The resultant mixture was kneaded into a slurry, which was applied to the both sides of a copper foil, as the negative-electrode current collector, by means of the doctor blade coating method and then subject to drying to obtain the negative electrode.

(Preparation of Non-Aqueous Electrolyte Solution)

In the preparation of non-aqueous electrolyte solutions of Examples 24 to 31, at least ethylene carbonate was employed for the solvent while at least one type of fluorine-containing compound was employed for the solute, as shown in the following Table 3.

More specifically, in Example 24, $LiPF_6$, as the solute, was dissolved in a concentration of 1 mol/l in a mixture solvent containing ethylene carbonate (hereinafter, referred to as 'EC') and diethyl carbonate (hereinafter, referred to as 'DEC') in a volume ratio of 50:50. In Example 25, $LiBF_6$, as the solute, was dissolved in a concentration of 1 mol/l in the same mixture solvent as in Example 24. In Example 26, $LiN(C_2F_5SO_2)_2$, as the solute, was dissolved in a concentration of 1 mol/l in the same mixture solvent as in Example 24. In Example 27, $LiAsF_6$, as the solute, was dissolved in a concentration of 1 mol/l in the same mixture solvent as in Example 24. In Example 28, $LiPF_6$, as the solute, was dissolved in a concentration of 1 mol/l in a mixture solvent containing EC and dimethyl carbonate (hereinafter, referred to as 'DMC') in a volume ratio of 50:50. In Example 29, $LIPF_6$ was dissolved in a concentration of 1 mol/l in a mixture solvent containing EC and γ-butyrolactone (hereinafter, referred to as 'G-BL') in a volume ratio of 50:50. In Example 30, $LiPF_6$ and $LiClO_4$ were each dissolved in a concentration of 0.5 mol/l in the same mixture solvent as in Example 24. In Example 31, $LiPF_6$ was dissolved in a concentration of 1 mol/l in a mixture solvent containing EC, propylene carbonate (hereinafter, referred to as 'PC') and DEC in a volume ratio of 25:25:50.

On the other hand, in Comparative Example 10, $LiClO_4$, as the solute, was dissolved in a concentration of 1 mol/l in the same mixture solvent of EC and DEC as in Example 24. In Comparative Example 11, $LiPF_6$ was dissolved in a concentration of 1 mol/l in a mixture solvent containing PC and DEC in a volume ratio of 50:50. In Comparative Example 12, $LiPF_6$ was dissolved in a concentration of 1 mol/l in a mixture solvent containing PC and 1,2-dimethoxyethane (hereinafter, referred to as 'DME') in a volume ratio of 1:1.

(Fabrication of Battery)

In the fabrication of the battery, a porous film permeable to lithium ions, as a separator 13, was interposed between the positive electrode 11 and the negative electrode 12 prepared in the aforementioned manner, which were wound into a spiral shape so as to be received in a battery can 14. Subsequently, each of the non-aqueous electrolyte solutions prepared in the aforementioned manners was poured into the battery can 14 which, in turn, was closed. The positive electrode 11 was connected to a positive-electrode external terminal 16 via a positive-electrode lead 15 whereas the negative electrode 12 was connected to the battery can 14 via a negative-electrode lead 17. The positive-electrode external terminal 16 and the battery can 14 were electrically insulated from each other by means of an insulating packing 18.

Next, the non-aqueous electrolyte batteries of Examples 24 to 31 and of Comparative Examples 10 to 12, thus fabricated, were each charged at the 200 mA charging current to the charge cut-off voltage of 4.2 V and then discharged at the 200 mA discharging current to the discharge cut-off voltage of 2.75 V so as to determine a discharge capacity of each non-aqueous electrolyte batteries before storage. Subsequently, the above non-aqueous electrolyte batteries were charged at the 200 mA charging current to the charge cut-off voltage of 4.2 V. The non-aqueous electrolyte batteries thus charged were committed to a twenty days' storage at a temperature of 60° C. and thereafter, returned to place at room temperatures so that the non-aqueous electrolyte batteries were each discharged at the 200 mA discharging current to the discharge cut-off voltage of 2.75 V. Discharge capacities of the respective batteries after the storage were determined so as to find the respective capacity residual rates of the batteries. The results are shown in the following Table 3.

TABLE 3

Positive Electrode Material: $LiNi_{0.7}Co_{0.2}Mn_{0.1}O_2$

| Mixture Solvent (Volume Ratio) | Type of Solute | Discharge Capacity (mAh) Before Storage | After Storage | Capacity Residual Rate (%) |
|---|---|---|---|---|
| Ex.24 | EC:DEC = 50:50 | $LiPF_6$ | 600 | 515 | 85.8 |
| Ex.25 | EC:DEC = 50:50 | $LiBF_4$ | 595 | 505 | 84.9 |
| Ex.26 | EC:DEC = 50:50 | $LiN(C_2F_5SO_2)_2$ | 600 | 510 | 85.0 |
| Ex.27 | EC:DEC = 50:50 | $LiAsF_6$ | 580 | 470 | 81.0 |
| Ex.28 | EC:DMC = 50:50 | $LiPF_6$ | 600 | 510 | 85.0 |
| Ex.29 | EC:G-BL = 50:50 | $LiPF_6$ | 590 | 500 | 84.7 |
| Ex.30 | EC:DEC = 50:50 | $LiPF_6 + LiClO_4$ | 580 | 465 | 80.2 |
| Ex.31 | EC:PC:DEC = 25:25:50 | $LiPF_6$ | 585 | 495 | 84.6 |
| C.Ex.10 | EC:DEC = 50:50 | $LiClO_4$ | 580 | 395 | 68.1 |
| C.Ex.11 | PC:DEC = 50:50 | $LiPF_6$ | 500 | 270 | 54.0 |
| C.Ex.12 | PC:DME = 50:50 | $LiPF_6$ | 500 | 250 | 50.0 |

As apparent from the table, where the lithium-metal compound oxide containing at least Ni, Co and Mn is used as the positive electrode material, the non-aqueous electrolyte batteries of Examples 24 to 31, wherein the non-aqueous electrolyte solution employs the solvent containing ethylene carbonate and the solute containing a fluorine-containing compound, all present smaller discharge capacity decrease after storage and thus accomplish a marked improvement in the capacity residual rate as compared with the non-aqueous electrolyte battery of Comparative Example 10 wherein the solute of the non-aqueous electrolyte solution does not contain the fluorine-containing compound and the batteries of Comparative Examples 11 and 12 wherein the solvent of the non-aqueous electrolyte solution does not contain ethylene carbonate.

According to a comparison among the non-aqueous electrolyte batteries of Examples 24 to 31, the batteries of Examples 24 to 29 and 31, wherein the solute of the non-aqueous electrolyte solution contains only the fluorine-containing compound, present smaller discharge capacity decrease after storage than the battery of Example 30 wherein the fluorine-containing compound was used in combination with another solute. Further, the non-aqueous electrolyte batteries of Examples 24 to 26, 28, 29 and 31, wherein any one of $LiPF_6$, $LiBF_4$ and $LiN(C_2F_5SO_2)_2$ is used as the solute, present even smaller discharge capacity decrease after storage than the battery of Example 27 employing $LiAsF_6$ as the solute.

EXAMPLES 32 to 40 AND COMPARATIVE EXAMPLES 13 to 18

In Examples 32 to 40 and Comparative Examples 13 to 18, only the positive electrode material for the positive electrode was varied from that employed in Example 24, respectively, whereas the aforesaid natural graphite was used as the negative electrode material for the negative electrode. The non-aqueous electrolyte solution was prepared by dissolving $LiPF_6$ in a concentration of 1 mol/l in a mixture solvent containing EC and DEC in a volume ratio of 50:50. Using the above components, non-aqueous electrolyte batteries of Examples 32 to 40 and of Comparative Examples 13 to 18 were fabricated in the same manner as in the aforementioned Example 24.

Positive electrode materials used in Examples 32 to 40 and Comparative Examples 13 to 18 each contained Li, Ni, Co and Mn in a ratio shown in the following Table 4. On the other hand, positive electrode materials used in Comparative Examples 13 to 18 each excluded at least any one of Ni, Co and Mn.

Similarly to Examples 24 to 31 and Comparative Examples 10 to 12, the non-aqueous electrolyte batteries of Examples 32 to 40 and of Comparative Examples 13 to 18 employing such positive electrode materials were each determined on the discharge capacities before and after storage thereby to find the capacity residual rate after storage. The results are shown in the following Table 4.

Each of the positive electrode materials used in Examples 32 to 40 and Comparative Examples 13 to 18 was subject to the powder X-ray diffraction analysis using the Cu-Kα X-ray source thereby to find a FWHM of the peak in the range of $2\theta=18.71\pm0.25°$. In addition, a peak intensity ratio I(003)/I(104) of each positive electrode material was found from an intensity I(003) of the peak in the range of $2\theta=18.71\pm0.25°$ and an intensity I(104) of the peak present in the range of $2\theta=44.54\pm0.25°$. The results are shown in the following Table 5.

TABLE 4

| | Positive Electrode Material | | | | Discharge Capacity (mAh) | | Capacity Residual Rate (%) |
|---|---|---|---|---|---|---|---|
| | Li | Ni | Co | Mn | Before Storage | After Storage | |
| Ex. 32 | 1 | 0.85 | 0.1 | 0.05 | 605 | 515 | 85.1 |
| Ex. 33 | 1 | 0.5 | 0.45 | 0.05 | 600 | 510 | 85.0 |
| Ex. 34 | 1 | 0.5 | 0.1 | 0.4 | 590 | 500 | 84.7 |
| Ex. 35 | 1 | 0.6 | 0.2 | 0.2 | 600 | 510 | 85.0 |
| Ex. 36 | 1 | 0.5 | 0.3 | 0.2 | 595 | 505 | 84.9 |
| Ex. 37 | 1 | 0.4 | 0.4 | 0.2 | 580 | 465 | 80.2 |
| Ex. 38 | 1 | 0.05 | 0.1 | 0.85 | 580 | 460 | 79.3 |
| Ex. 39 | 1 | 0.05 | 0.9 | 0.05 | 580 | 460 | 79.3 |
| Ex. 40 | 1 | 0.9 | 0.05 | 0.05 | 600 | 390 | 65.0 |
| C. Ex. 13 | 1 | 1 | 0 | 0 | 620 | 375 | 60.5 |
| C. Ex. 14 | 1 | 0 | 1 | 0 | 580 | 360 | 62.0 |
| C. Ex. 15 | 1 | 0 | 0 | 1 | 530 | 300 | 56.6 |
| C. Ex. 16 | 1 | 0.9 | 0.1 | 0 | 610 | 375 | 61.5 |

TABLE 4-continued

| Positive Electrode Material | | | | Discharge Capacity (mAh) | | Capacity Residual Rate (%) |
|---|---|---|---|---|---|---|
| Li | Ni | Co | Mn | Before Storage | After Storage | |
| C. Ex. 17 | 1 | 0 | 0.9 | 0.1 | 570 | 365 | 64.0 |
| C. Ex. 18 | 1 | 0.1 | 0 | 0.9 | 545 | 320 | 58.7 |

TABLE 5

| Positive Electrode Material | | | | FWHM (°) | Peak Intensity Ratio I(003)/I(004) |
|---|---|---|---|---|---|
| Li | Ni | Co | Mn | | |
| Ex.32 | 1 | 0.85 | 0.1 | 0.05 | 0.16 | 1.3 |
| Ex.33 | 1 | 0.5 | 0.45 | 0.05 | 0.19 | 1.3 |
| Ex.34 | 1 | 0.5 | 0.1 | 0.4 | 0.20 | 1.7 |
| Ex.35 | 1 | 0.6 | 0.2 | 0.2 | 0.20 | 1.5 |
| Ex.36 | 1 | 0.5 | 0.3 | 0.2 | 0.21 | 1.3 |
| Ex.37 | 1 | 0.4 | 0.4 | 0.2 | 0.21 | 1.5 |
| Ex.38 | 1 | 0.05 | 0.1 | 0.85 | 0.19 | 1.6 |
| Ex.39 | 1 | 0.05 | 0.9 | 0.05 | 0.20 | 1.5 |
| Ex.40 | 1 | 0.9 | 0.05 | 0.05 | 0.19 | 1.6 |
| C.Ex.13 | 1 | 1 | 0 | 0 | 0.17 | 1.1 |
| C.Ex.14 | 1 | 0 | 1 | 0 | 0.18 | 1.3 |
| C.Ex.15 | 1 | 0 | 0 | 1 | 0.19 | 1.4 |
| C.Ex.16 | 1 | 0.9 | 0.1 | 0 | 0.18 | 1.3 |
| C.Ex.17 | 1 | 0 | 0.9 | 0.1 | 0.19 | 1.5 |
| C.Ex.18 | 1 | 0.1 | 0 | 0.9 | 0.20 | 1.5 |

As apparent from the table, in the case of the non-aqueous electrolyte solution prepared by dissolving the solute containing a fluorine-containing compound in the solvent containing ethylene carbonate, the non-aqueous electrolyte batteries of Examples 32 to 40, wherein the lithium-metal compound oxide containing Ni, Co and Mn is used as the positive electrode material for the positive electrode, all present smaller discharge capacity decrease after storage and improved capacity residual rate as compared with the batteries of Comparative Examples 13 to 18 wherein the lithium-metal compound oxide excluding any one or more of Ni, Co and Mn is used as the positive electrode material.

According to a comparison among the non-aqueous electrolyte batteries of Examples 32 to 40, the batteries of Examples 32 to 39, each employing the lithium-metal compound oxide represented by the aforesaid general formula (2) as the positive electrode material, all present smaller discharge capacity decrease after storage and accomplish much greater improvement in the capacity residual rate than the battery of Example 40 employing the positive electrode material not satisfying the conditions of the formula (2).

EXAMPLES 41 to 51

In Examples 41 to 51, as well, only the positive electrode material for the positive electrode was varied from that of Example 24, respectively, whereas the aforesaid natural graphite was used as the negative electrode material for the negative electrode. The non-aqueous electrolyte solution was prepared by dissolving $LiPF_6$ in a concentration of 1 mol/l in a mixture solvent containing EC and DEC in a volume ratio of 50:50. Using the above components, non-aqueous electrolyte batteries of Examples 41 to 51 were fabricated in the same manner as in Example 24.

Examples 41 to 51 each employed, as the positive electrode material, a compound represented by a formula of $LiNi_{0.6}Co_{0.2}Mn_{0.1}(M)_{0.1}O_2$ wherein a type of metal denoted by (M) was varied as shown in the following Table 5.

Each of the above positive electrode materials was subject to the powder X-ray diffraction analysis using the Cu-Kα X-ray source thereby to determine a FWHM of the peak in the range of $2\theta=18.71\pm0.25°$. In addition, a peak intensity ratio I(003)/I(104) was determined from an intensity I(003) of the peak in the range of $2\theta=18.71\pm0.25°$ and an intensity I(104) of the peak in the range of $2\theta=44.54\pm0.25°$. The results are shown in the following Table 6.

Similarly to the aforementioned Examples 24 to 31 and Comparative Examples 10 to 12, the non-aqueous electrolyte batteries of Examples 41 to 51 fabricated using the above positive electrode materials were each determined on the discharge capacities before and after storage thereby to find the capacity residual rate. The results are also shown in the following Table 6.

TABLE 6

Positive Electrode Material: $LiNi_{0.6}Co_{0.2}Mn_{0.1}(M)_{0.1}O_2$

| | Type of (M) | FWHM (°) | Peak Intensity Ratio I(003)/I(004) | Discharge Capacity (mAh) | | Capacity Residual Rate (%) |
|---|---|---|---|---|---|---|
| | | | | Before Storage | After Storage | |
| Ex.41 | B | 0.21 | 1.3 | 595 | 485 | 81.5 |
| Ex.42 | Al | 0.16 | 1.5 | 580 | 465 | 80.2 |
| Ex.43 | Si | 0.20 | 1.4 | 595 | 480 | 80.7 |
| Ex.44 | Ti | 0.17 | 1.6 | 590 | 480 | 81.4 |
| Ex.45 | Fe | 0.15 | 1.5 | 590 | 475 | 80.5 |
| Ex.46 | V | 0.20 | 1.6 | 590 | 475 | 80.5 |
| Ex.47 | Cr | 0.21 | 1.6 | 590 | 470 | 79.7 |
| Ex.48 | Cu | 0.18 | 1.5 | 595 | 475 | 79.8 |
| Ex.49 | Zn | 0.17 | 1.4 | 585 | 475 | 81.2 |
| Ex.50 | Ga | 0.20 | 1.4 | 585 | 470 | 80.3 |
| Ex.51 | W | 0.20 | 1.2 | 585 | 475 | 81.2 |

As apparent from the table, even where the compound oxide of lithium and metals, which include a metal denoted by (M) besides Ni, Co and Mn, is used as the positive electrode material, by virtue of the use of the non-aqueous electrolyte solution prepared by dissolving the solute containing the fluorine-containing compound in the solvent containing ethylene carbonate, the non-aqueous electrolyte batteries of Examples 41 to 51 present smaller discharge capacity decrease after storage and notably improved capacity residual rate as compared with the non-aqueous electrolyte batteries of Comparative Examples 10 to 18.

Figure 3:
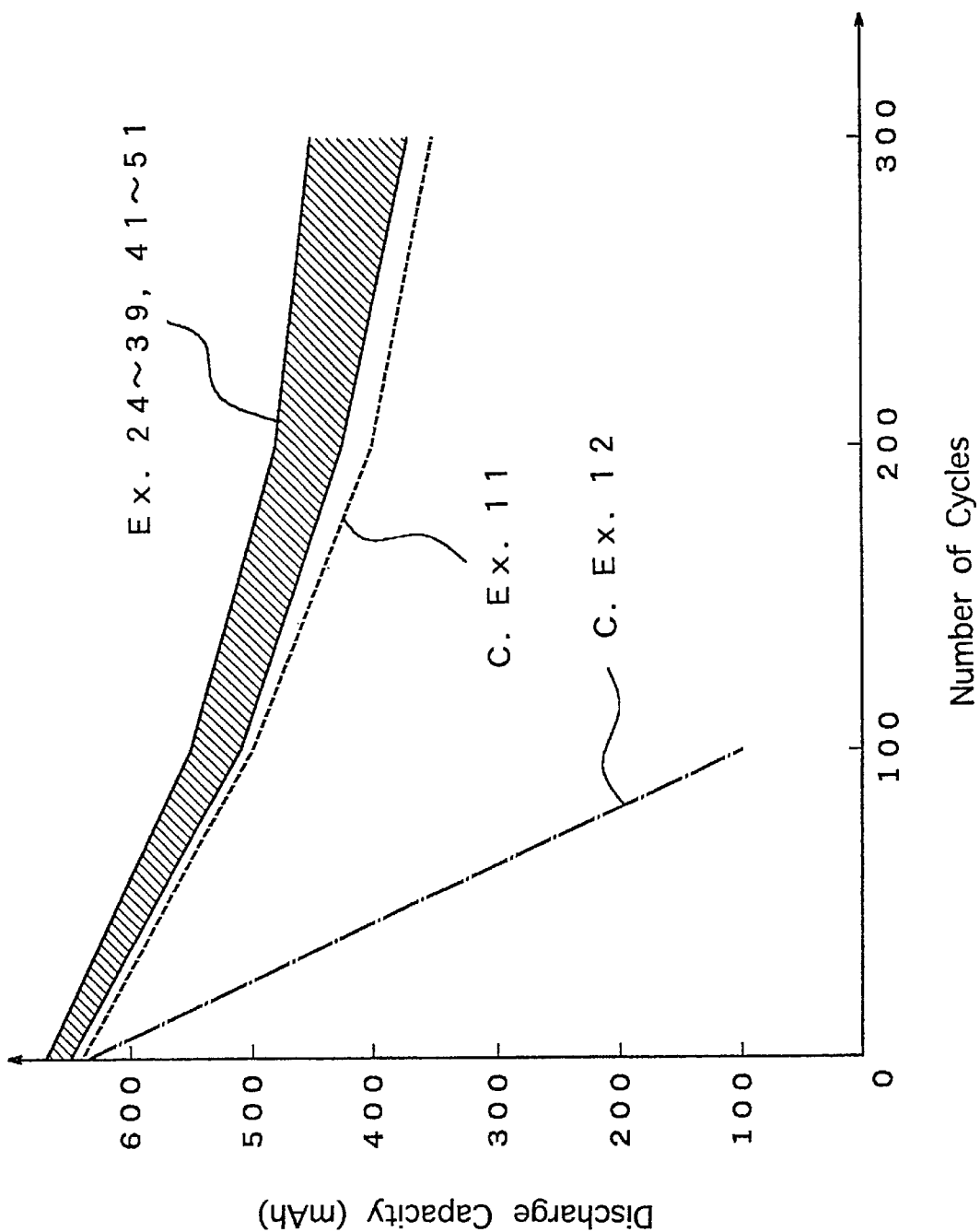
FIG. 3 is a graphical representation of relationship between the number of charge/discharge cycles and the discharge capacity of the non-aqueous electrolyte batteries of Examples 24 to 39 and 41 to 51 and of Comparative Examples 11 and 12.

Next, the non-aqueous electrolyte batteries of Examples 24 to 39 and 41 to 51 and of Comparative Examples 11 and 12 were each subjected to repeated charge/discharge processes at a temperature of 60° C. in a cycle of charging the battery at the 0.5 mA/cm² charging current to the charge cut-off voltage of 4.25 V followed by discharging the battery at the 0.5 mA/cm² discharging current to the discharge cut-off voltage of 2.75 V, thereby to find a relationship between the number of cycles and the discharge capacity of each non-aqueous electrolyte battery. The results are shown in FIG. 3.

The results show that the non-aqueous electrolyte batteries of Examples 24 to 39 and 41 to 51 all present smaller discharge capacity decrease associated with an increased number of cycles as compared with the batteries of Comparative Examples 11 and 12. Thus, the non-aqueous electrolyte batteries of the above Examples are improved in the charge-discharge cycle characteristics.

Although the present invention has been fully described by way of examples, it is to be noted that various changes and modifications will be apparent to those skilled in the art. Therefore, unless otherwise such changes and modifications depart from the scope of the present invention, they should be construed as being included therein.

What is claimed is:

1. A positive electrode material for use in a non-aqueous electrolyte battery comprising a lithium-metal compound oxide containing at least Ni, Co and Mn and in addition, M, which denotes at least one element selected from the group consisting of B, Al, Si, Fe, V, Cr, Cu, Zn, Ga and W, the lithium-metal compound oxide having a peak with a full width at half maximum of not greater than 0.22° in a range of $2\theta=18.71\pm0.25°$, as measured by the powder X-ray diffraction analysis using a Cu-K$\alpha$ X-ray source.

2. A positive electrode material for use in the non-aqueous electrolyte battery as set forth in claim 1, wherein said lithium-metal compound oxide is represented by a formula:

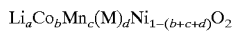

$$Li_aCo_bMn_c(M)_dNi_{1-(b+c+d)}O_2$$

wherein (M) denotes at least one element selected from the group consisting of B, Al, Si, Fe, V, Cr, Cu, Zn, Ga and W; $0<a<1.2$; $0.1\leq b\leq 0.5$; $0.05\leq c\leq 0.4$; $0.01\leq d\leq 0.4$; and $0.15\leq b+c+d\leq 0.5$.

3. A positive electrode material for use in the non-aqueous electrolyte battery as set forth in claim 1, wherein said lithium-metal compound oxide has a relationship of $I(003)/I(104)\geq 0.8$ with $I(003)$ denoting an intensity of the peak in the range of $2\theta=18.71\pm0.25°$ and $I(104)$ denoting an intensity of a peak in a range of $2\theta=44.54\pm0.25°$, as measured by the powder X-ray diffraction analysis using the Cu-K$\alpha$ X-ray source.

4. A process for preparing a positive electrode material for use in a non-aqueous electrolyte battery comprising the steps of:

adding an alkaline solution to a mixture solution containing at least salts of Ni, Co and Mn and in addition, M, which denotes at least one element selected from the group consisting of B, Al, Si, Fe, V, Cr, Cu, Zn, Ga and W, thereby to obtain a compound hydroxide of these metals, mixing a lithium compound with said compound hydroxide, and sintering said mixture of the compound hydroxide and the lithium compound.

5. A non-aqueous electrolyte battery comprising a positive electrode employing a lithium-metal compound oxide as a positive electrode material, a negative electrode and a non-aqueous electrolyte solution, said positive electrode material comprising the lithium-metal compound oxide containing at least Ni, Co and Mn, and in addition, M, which denotes at least one element selected from the group consisting of B, Al, Si, Fe, V, Cr, Cu, Zn, Ga, and W, and having a peak with a full width at half maximum of not greater than 0.22° in a range of $2\theta=18.71\pm0.25°$ as measured by the powder X-ray diffraction analysis using a Cu-K$\alpha$ X-ray source.

6. A non-aqueous electrolyte battery as set forth in claim 5, wherein said non-aqueous electrolyte solution comprises a solvent containing ethylene carbonate and a solute containing at least one type of fluorine-containing compound.

7. A non-aqueous electrolyte battery as set forth in claim 5, wherein said lithium-metal compound oxide is represented by a formula:

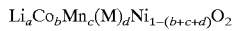

$$Li_aCo_bMn_c(M)_dNi_{1-(b+c+d)}O_2$$

wherein (M) denotes at least one element selected from the group consisting of B, Al, Si, Fe, V, Cr, Cu, Zn, Ga and W; $0<a<1.2$; $0.1\leq b\leq 0.5$; $0.05\leq c\leq 0.4$; $0.01\leq d\leq 0.4$; and $0.15\leq b+c+d\leq 0.5$.

8. A non-aqueous electrolyte battery as set forth in claim 7, wherein said non-aqueous electrolyte solution comprises a solvent containing ethylene carbonate and a solute containing at least one type of fluorine-containing compound.

9. A non-aqueous electrolyte battery as set forth in claim 5, wherein said lithium-metal compound oxide has a relationship of $I(003)/I(104)\geq 0.8$ with $I(003)$ denoting an intensity of the peak in the range of $2\theta=18.71\pm0.25°$ and $I(104)$ denoting an intensity of a peak in a range of $2\theta=44.54\pm0.25°$, as measured by the powder X-ray diffraction analysis using the Cu-K$\alpha$ X-ray source.

10. A non-aqueous electrolyte battery as set forth in claim 9, wherein said non-aqueous electrolyte solution comprises a solvent containing ethylene carbonate and a solute containing at least one type of fluorine-containing compound.

11. A non-aqueous electrolyte battery comprising a positive electrode employing a lithium-metal compound oxide as a positive electrode material, a negative electrode and a non-aqueous electrolyte solution, said positive electrode material comprising the lithium-metal compound oxide containing at least Ni, Co and Mn, and in addition, M, which denotes at least one element selected from the group consisting of B, Al, Si, Fe, V, Cr, Cu, Zn, Ga, and W, said non-aqueous electrolyte solution comprising a solvent containing ethylene carbonate and a solute containing at least one type of fluorine-containing compound.

12. A non-aqueous electrolyte battery as set forth in claim 11, wherein said lithium-metal compound oxide has a peak with a full width at half maximum of not greater than 0.22° as measured by the powder X-ray diffraction analysis using a Cu-K$\alpha$ X-ray source.

13. A non-aqueous electrolyte battery as set forth in claim 11, wherein said lithium-metal compound oxide is represented by a formula:

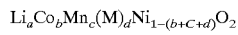

$$Li_aCo_bMn_c(M)_dNi_{1-(b+c+d)}O_2$$

wherein (M) denotes at least one metal selected from the group consisting of B, Al, Si, Ti, Fe, V, Cr, Cu, Zn, Ga and W; $0<a<1.2$; $0.1\leq b<1$; $0.05\leq c<1$; $0\leq d<1$; and $0.15\leq b+c+d<1$.

14. A non-aqueous electrolyte battery as set forth in claim 13, wherein said lithium-metal compound oxide has a peak with a full width at half maximum of not greater than 0.22° as measured by the powder X-ray diffraction analysis using a Cu-K$\alpha$ X-ray source.

15. A non-aqueous electrolyte battery as set forth in claim 11, wherein said negative electrode employs a carbon material as a negative electrode material.

16. A non-aqueous electrolyte battery as set forth in claim 11, wherein said non-aqueous electrolyte solution comprises a mixture solvent of ethylene carbonate and another solvent, the mixture solvent containing ethylene carbonate in a concentration of between 20 and 80 vol %.

17. A non-aqueous electrolyte battery as set forth in claim 11, said fluorine-containing compound is at least one type selected from the group consisting of $LiPF_6$, $LiBF_4$, $LiN(C_2F_5SO_2)_2$ and $LiAsF_6$.

18. A non-aqueous electrolyte battery as set forth in claim 11, wherein a total amount of the solute contained in said non-aqueous electrolyte solution is in a range of between 0.5 and 2.0 mol/l.

* * * * *